(12) United States Patent
Sauerlander et al.

(10) Patent No.: US 10,757,782 B2
(45) Date of Patent: Aug. 25, 2020

(54) AC/DC CONVERTERS HAVING POWER FACTOR CORRECTION

(71) Applicant: SIGNIFY HOLDING B.V., Eindhoven (NL)

(72) Inventors: Georg Sauerlander, Aachen (DE); Christian Hattrup, Wurselen (DE)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/461,988

(22) PCT Filed: Nov. 14, 2017

(86) PCT No.: PCT/EP2017/079189
§ 371 (c)(1),
(2) Date: May 17, 2019

(87) PCT Pub. No.: WO2018/095763
PCT Pub. Date: May 31, 2018

(65) Prior Publication Data
US 2019/0327807 A1  Oct. 24, 2019

(30) Foreign Application Priority Data

Nov. 24, 2016  (EP) ..................................... 16200405

(51) Int. Cl.
| | |
|---|---|
| *H05B 45/37* | (2020.01) |
| *H05B 45/10* | (2020.01) |
| *H02M 1/42* | (2007.01) |
| *H02M 7/219* | (2006.01) |

(52) U.S. Cl.
CPC .......... *H05B 45/37* (2020.01); *H02M 1/4225* (2013.01); *H02M 7/219* (2013.01); *H05B 45/10* (2020.01)

(58) Field of Classification Search
None
See application file for complete search history.

(56) References Cited

U.S. PATENT DOCUMENTS

| | | | |
|---|---|---|---|
| 5,371,667 A | 12/1994 | Nakao et al. | |
| 8,379,421 B2 * | 2/2013 | Nishijima | H02M 1/4208 323/207 |
| 8,446,134 B2 * | 5/2013 | Manor | H02M 1/14 323/271 |
| 8,581,498 B1 * | 11/2013 | Cheung | H05B 33/0815 315/119 |

(Continued)

FOREIGN PATENT DOCUMENTS

| | | |
|---|---|---|
| EP | 2180765 A1 | 4/2010 |
| EP | 2302980 A2 | 3/2011 |

(Continued)

*Primary Examiner* — Crystal L Hammond
(74) *Attorney, Agent, or Firm* — Daniel J. Piotrowski

(57) ABSTRACT

An AC/DC converter and conversion method are provided, in which an AC input is rectified and shaped by a waveform shaping capacitor. A current source circuit is used to provide the output current to the output load which has a parallel bulk capacitor. The current source circuit is switched on and off with timing which is dependent on the phase of the AC input signal. This enables a relatively high power factor, for example between 0.7 and 0.9, with low cost circuitry with few components.

15 Claims, 7 Drawing Sheets

(56) References Cited

U.S. PATENT DOCUMENTS

| | | | |
|---|---|---|---|
| 9,030,185 B2 * | 5/2015 | Nishibori | G05F 1/70 |
| | | | 323/222 |
| 9,413,226 B1 * | 8/2016 | Lin | H02M 1/4258 |
| 2008/0123379 A1 | 5/2008 | Smidt et al. | |
| 2013/0049618 A1 | 2/2013 | Radermacher | |
| 2013/0313991 A1 | 11/2013 | Pan et al. | |
| 2014/0049993 A1 * | 2/2014 | Kelly | H02M 1/4225 |
| | | | 363/44 |
| 2015/0280592 A1 | 10/2015 | Hu et al. | |

FOREIGN PATENT DOCUMENTS

| | | |
|---|---|---|
| JP | 2012084489 A | 4/2012 |
| WO | 2016066400 A1 | 5/2016 |

\* cited by examiner

AC/DC CONVERTERS HAVING POWER FACTOR CORRECTION

CROSS-REFERENCE TO PRIOR APPLICATIONS

This application is the U.S. National Phase application under 35 U.S.C. § 371 of International Application No. PCT/EP2017/079189, filed on Nov. 14, 2017 which claims the benefit of European Patent Application No. 16200405.5, filed on Nov. 24, 2016. These applications are hereby incorporated by reference herein.

FIELD OF THE INVENTION

This invention relates to power factor correction within AC/DC converters.

BACKGROUND OF THE INVENTION

There are many devices which require AC/DC conversion in order to be powered by the mains.

This invention is of particular interest to LED lighting, in which an AC/DC converter supplies an LED driver. The LED driver for example comprises a resonant DC/DC converter, which can be configured or operated as a constant current source or a constant voltage source. A constant current source can be used to drive an LED arrangement directly, thus enabling a single stage driver. Constant voltage sources can be used, for example, for LED modules which have further driver electronics in order to ensure a corresponding power supply to the LEDs with a predetermined current from the output voltage provided by the constant voltage source.

One function implemented within a power converter which is supplied with mains (or other AC) power is power factor correction (PFC). The power factor of an AC electrical power system is defined as the ratio of the real power flowing to the load to the apparent power in the circuit. A power factor of less than one means that the voltage and current waveforms are not in phase or distorted, reducing the instantaneous product of the two waveforms. The real power is the capacity of the circuit for performing work in a particular time. The apparent power is the product of the current and voltage of the circuit.

Due to energy stored in the load and returned to the source, or due to a non-linear load that distorts the wave shape of the current drawn from the source, the apparent power will be greater than the real power.

If a power supply is operating at a low power factor, a load will draw more current for the same amount of useful power transferred than for a higher power factor.

The power factor can be increased using power factor correction. For linear loads, this may involve the use of a passive network of capacitors or inductors. Non-linear loads typically require active power factor correction to counteract the distortion and raise the power factor. The (passive) power factor correction brings the power factor of the AC power circuit closer to unity by supplying reactive power of opposite sign, adding capacitors or inductors that act to cancel the inductive or capacitive effects of the load.

Active PFC makes use of power electronics to change the waveform of the current drawn by a load to improve the power factor. Active PFC circuits may for example be based on buck, boost or buck-boost switched mode converter topologies. Active power factor correction can be single-stage or multi-stage.

The power factor is typically required to be greater than 0.9 for high power lighting, above 25 W. For professional lighting applications the power factor is also usually required to be equal to or larger than 0.9 even below an input power of 25 W. Since the lighting industry has always been extremely cost driven, the relevant standards (IEC61000-3-2) allow for lower power factors (>0.5) for input powers lower than 25 W. There is a so-called "special waveform" requirement set by the standard that guarantees that although the power factor is lower than 0.9, the mains input current harmonics are still acceptable.

This special waveform was defined such that a typical passive AC-DC converter could be used for lighting, namely the so-called bridge/electrolytic capacitor combination, as shown in FIG. 1.

This comprises a full bridge rectifier 10 receiving a mains input 12 and the rectified DC signal provided by the rectifier is directly connected to a high voltage electrolytic capacitor 14, usually in combination with an AC series resistor for limiting the capacitive inrush current. The output load is represented by resistor RL, and represents any kind of circuitry consuming the input power, e.g. a LED driver. Current is drawn from the mains through an input resistor Rin.

In FIG. 2 the typical waveforms of such a circuit are depicted. Plot 20 shows the mains input voltage (between live and neutral), plot 22 shows the current drawn from the mains through the input resistor Rin and plot 24 shows the output voltage across the capacitor 14 and load RL.

The limitation of this circuit is that the power factor only reaches 0.5 to 0.6, and is therefore not suited to meet higher power factor requirements, for example as required in California, and/or achieve the Energy Star label in the US. Power factor correction circuits achieving power factor of 0.9 are more complex. For example, in some solutions, a power factor boost correcting converter is inserted between the bridge rectifier and the mains storage capacitor. The boost converter enforces a current that is always in phase with and at the same frequency as the line voltage. The resulting power fluctuation at twice the mains frequency is filtered by a high voltage bulk capacitor, limiting the resulting (inherent) output voltage ripple. Another switched-mode converter inside the power supply produces the desired output voltage or current from the DC bus. This example results in a dual stage converter, the first stage is the PFC boost stage and the second stage is the other switched-mode converter to provide the output voltage or current. The bulk capacitor provides the required energy storage to bridge the input power gap when the AC voltage is (close to) zero.

A solution is therefore needed that provides a somewhat higher power factor, for example of at least 0.7, at reasonable cost, without needing to use the more expensive solutions for power factors above 0.9.

US 2008/0123379 discloses a voltage regulating circuit comprising a rectifier for receiving an AC voltage and for generating a rectified AC voltage, and a capacitor connected in parallel with said rectified AC voltage for providing a DC voltage over a load, characterized by a unidirectional current switch provided between the rectifier and the capacitor, and a control block arranged to activate the switch at selected instances during negative slopes of the rectified AC voltage so that said DC voltage does not exceed a predetermined voltage limit. By controlling the voltage provided by the rectified mains, the DC voltage can be regulated to any preset value (lower than the AC mains peak value). The inventive voltage stabilizer will guarantee a desired constant DC load voltage value for different mains peak input voltages and under wide range of load variations. Thereby a converter driven by this voltage can be more optimized or even be unregulated.

US 2013/0049618 discloses an adaptive circuit for driving a lower-voltage DC load from a rectified higher-voltage AC supply, which adaptive circuit comprises a charge-storage circuit, which charge storage circuit comprises a first capacitor and a second capacitor connected essentially in series, wherein the second capacitor is connected at least in parallel with the load; and an active switch realised as a controlled current source for controlling a load current through the load such that, in a closed switch state, load current is drawn essentially from the first capacitor of the charge-storage circuit, and, during an open switch state, load current is drawn essentially from the second capacitor. The invention also describes an LED retrofit lamp comprising a connecting means for connecting the lamp to a higher-voltage mains supply signal; an LED device rated for a lower-voltage supply; and such an adaptive circuit for adapting the higher-voltage mains supply signal to a low-voltage signal for driving the lower-voltage LED device. The invention also describes a method of driving a lower voltage DC load from a rectified higher-voltage AC supply.

SUMMARY OF THE INVENTION

The invention is defined by the claims.

According to a first set of examples there is provided an AC/DC converter, comprising:

an AC input for receiving an AC input signal and a DC output for supplying an output load;

a rectifier providing a rectified signal between first and second rectifier terminals;

a waveform shaping capacitor connected between the first and second rectifier terminals;

a current source circuit connected in series with the DC output; and a bulk capacitor connected in parallel with the DC output having a larger capacitance than the waveform shaping capacitor, wherein the current source circuit is adapted to switch on and off with timing which is dependent on the phase of the AC input signal.

This converter makes use of the standard configuration of a rectifier and capacitor across the rectifier DC terminals. However, that capacitor is only a waveform shaping component which is not large enough to function as a bulk storage capacitor.

On its own, the waveform shaping capacitor is for example not large enough to prevent discontinuities in the current flow to the output load. Instead, a further bulk capacitor is provided across the load.

The output current is delivered by a current source circuit, which controls the sum of the load current and the charging/discharging current of the bulk capacitor. The current source circuit is thus functionally in series with the load. When the current source circuit is switched on, current is drawn from the input, and when it is switched off, no current is drawn from the input.

This circuit enables an increase in the power factor compared to a basic rectifier circuit, but without introducing excessive complexity to the circuit. This is achieved by setting the timing at which current is drawn from the input and provided to the output (i.e. the load) in dependence on the phase of the AC input signal. It enables integration of the converter into a low cost product, such as an LED bulb.

The current source circuit is for example adapted to deliver a constant current when switched on. This enables a simple implementation of the current source circuit.

In one example the current source circuit comprises a linear current source circuit. This enables a simple circuit implementation. The current source circuit for example comprises a transistor in series with the DC output and a constant voltage source providing a control voltage to a control terminal of the transistor (i.e. base of a bipolar junction transistor or gate of a field effect transistor). A shunt resistor may be provided between the transistor and a lower reference terminal (e.g. ground). Changes in the mains input voltage then result in changes in the collector-emitter or drain-source transistor voltage, effectively controlling the switching on and off of the current source circuit. The amplitude of the current is for example determined by the DC voltage source, the base-emitter transistor voltage and the size of the shunt resistor.

In another example, the current source circuit comprises a switch mode power converter, for example a buck converter (or a boost or buck-boost converter). This enables a higher efficiency to be achieved over a wider range of the mains input voltage.

The converter preferably further comprises a blocking diode in series with the DC output. This limits the reverse voltage across the load.

The converter for example is adapted to switch on the current source when a phase angle of the AC input signal is smaller than $\pi/3$ radians and to subsequently switch off the current source circuit when a phase angle of the AC input signal is greater than $\pi/2$ radians. These conditions enable the power factor to be increased. The switching on and off of the current source circuit is for example automatic and results from the prevailing currents and voltages in the circuit, rather than needing any active control.

The converter for example has a power factor of between 0.7 and 0.9.

By way of example, the waveform shaping capacitor may have a capacitance in the range 100 nF to 1 µF and the bulk capacitor may have a capacitance in the range 1 to 100 µF. A smaller waveform shaping capacitor gives rise to a more square current waveform profile and a higher power factor, but it does not enable a continuous current to be provided to the load. This is ensured by the bulk capacitor across the load, in combination with the use of the current source circuit.

The AC/DC converter as defined above may be used as part of an LED driver. In this case, the output is an LED load. The LED string voltage is taken into account in the design of the current source circuit and the drive voltage applied to the current source circuit in order to achieve the desired timing (relative to the phase of the input) of the operation of the current source circuit. Alternatively, the timing can also actively be set by additional control circuitry.

The invention also provides a lighting circuit comprising:

an LED driver using the AC/DC converter as defined above; and an LED load connected to the DC output.

Examples in accordance with another aspect of the invention provide an AC/DC conversion method, comprising:

receiving an AC input signal;

rectifying the AC input signal;

shaping the rectified signal using a waveform shaping capacitor; and providing an output current to an output load with a bulk capacitor in parallel with the output load having a larger capacitance than the waveform shaping capacitor, the output current being delivered from the rectifier and waveform shaping capacitor using a current source circuit, wherein the method comprises switching on and off the current source circuit with timing which is dependent on the phase of the AC input signal.

The method may comprise providing a constant current when the current source circuit is switched on.

The current source circuit may comprise a linear current source circuit or a classical DC-DC converter, e.g. a buck, a boost or a buck-boost converter.

The method may comprise switching on the current source circuit when a phase angle of the AC input signal is smaller than 65 degrees and subsequently switching off the current source circuit when a phase angle of the AC input signal is greater than 90 degrees. The method may be used to drive an LED arrangement.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides an AC/DC converter and conversion method, in which an AC input current is rectified and shaped by a waveform shaping capacitor. A current source circuit is used to provide current to the output load and a bulk capacitor in parallel to the load. The current source circuit is switched on and off with timing which is dependent on the phase of the AC input signal. This enables a relatively high power factor, for example between 0.7 and 0.9, with low cost circuitry with few components.

As explained above, there is a need to increase the power factor above 0.5 (which applies to the circuit of FIG. 1) but without adding excessive circuit complexity.

To improve the power factor, two common solutions are already typically used.

Figure 3:
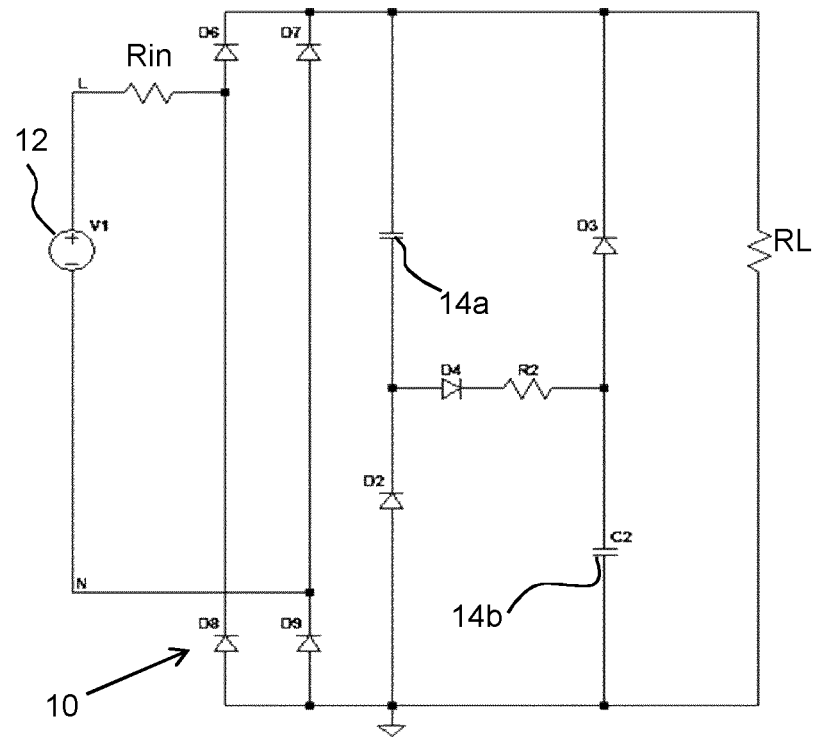
FIG. 3 shows an example of a known so-called passive valley-fill circuit.

FIG. 3 shows an example of a so-called passive valley-fill circuit, in which an additional passive analog circuit is provided between two output capacitors 14a and 14b and the load, in the form of a network of resistors, diodes and the two capacitors 14a and 14b.

Figure 2:
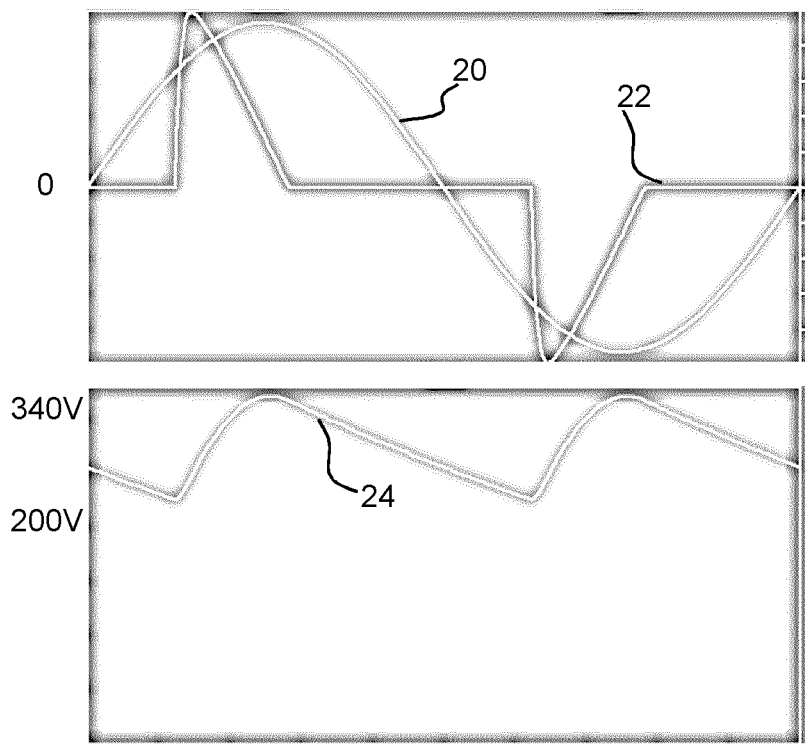
FIG. 2 shows waveforms to illustrate the operation of the circuit of FIG. 1.
Figure 4:
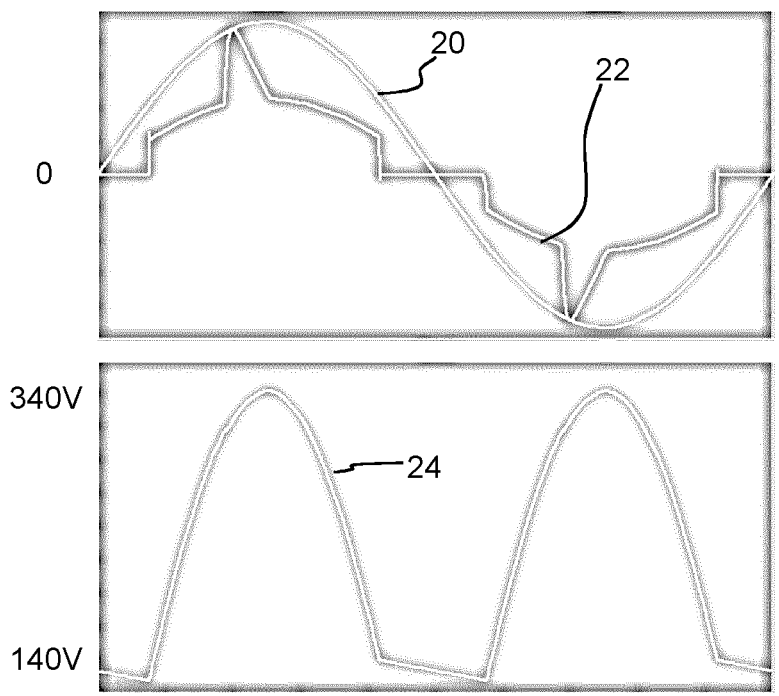
FIG. 4 shows waveforms to illustrate the operation of the circuit of FIG. 3.

FIG. 4 shows the waveforms corresponding to those in FIG. 2 for the circuit of FIG. 3.

Figure 5:
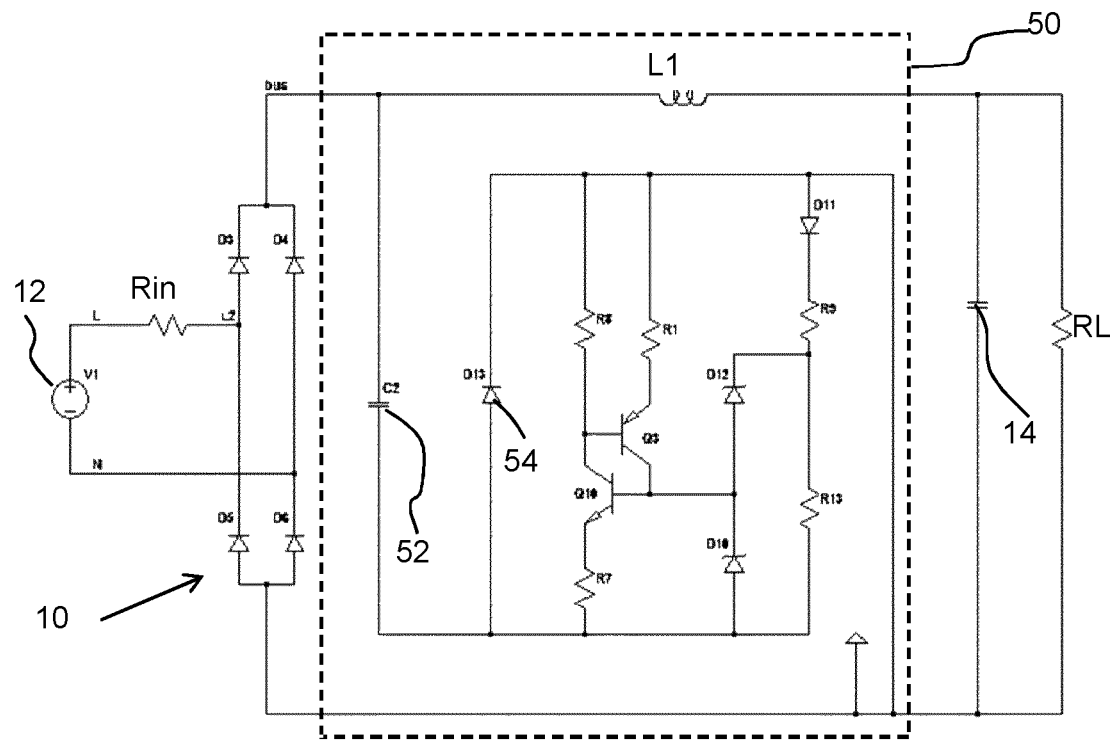
FIG. 5 shows an example of a so-called active valley-fill circuit.

FIG. 5 shows an example of a so-called active valley-fill circuit 50, in which a bulk capacitor 52 is charged to the peak of the rectified mains, and the energy that is stored in the capacitor 52 is only released once the reverse voltage across a diode 54 has reached a preset threshold. The circuitry in parallel with the diode 54 thereby effectively forms a switch that latches once the threshold voltage is exceeded. In this particular example, capacitor 14 is small compared to capacitor 52, and only needed if an EMI filter is required (formed by capacitor 14 and the inductor L1).

Figure 6:
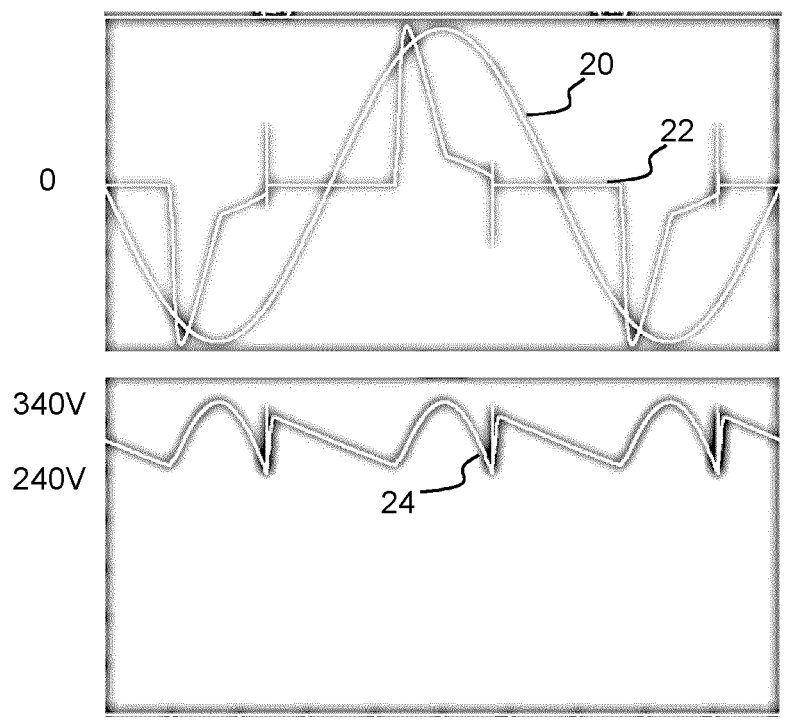
FIG. 6 shows waveforms to illustrate the operation of the circuit of FIG. 5.

FIG. 6 shows the waveforms corresponding to those in FIG. 2 for the circuit of FIG. 5.

Figure 1:
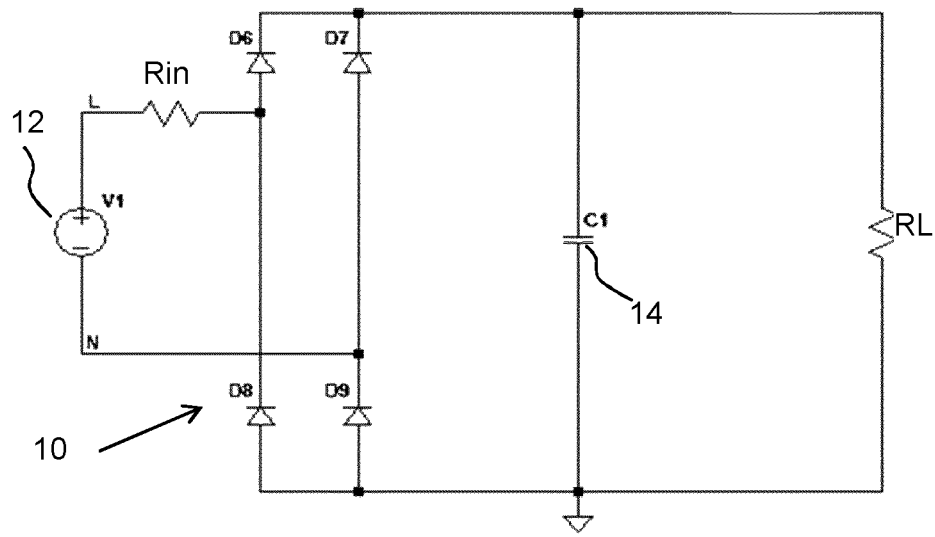
FIG. 1 shows a typical passive AC-DC converter.

The concept in both circuits is to extend the current conduction angle of the classical circuit of FIG. 1 more towards the mains voltage zero crossings, effectively increasing the power factor to the desired value, while at the same time keeping a high voltage at the DC output.

The main problems associated with these solutions are the following:
- the number of components is still relatively large, especially the active circuit;
- the valley fill circuit has an intrinsically large voltage ripple of approximately 50% (Vmax:Vmin=2:1);
- the driver efficiency is reduced, especially if they are designed to meet the special waveform requirements of IEC61000-3-2;
- the solutions are relatively expensive; and
- the solutions require a somewhat larger EMI filter compared to the classical circuit of FIG. 1.

Figure 7:
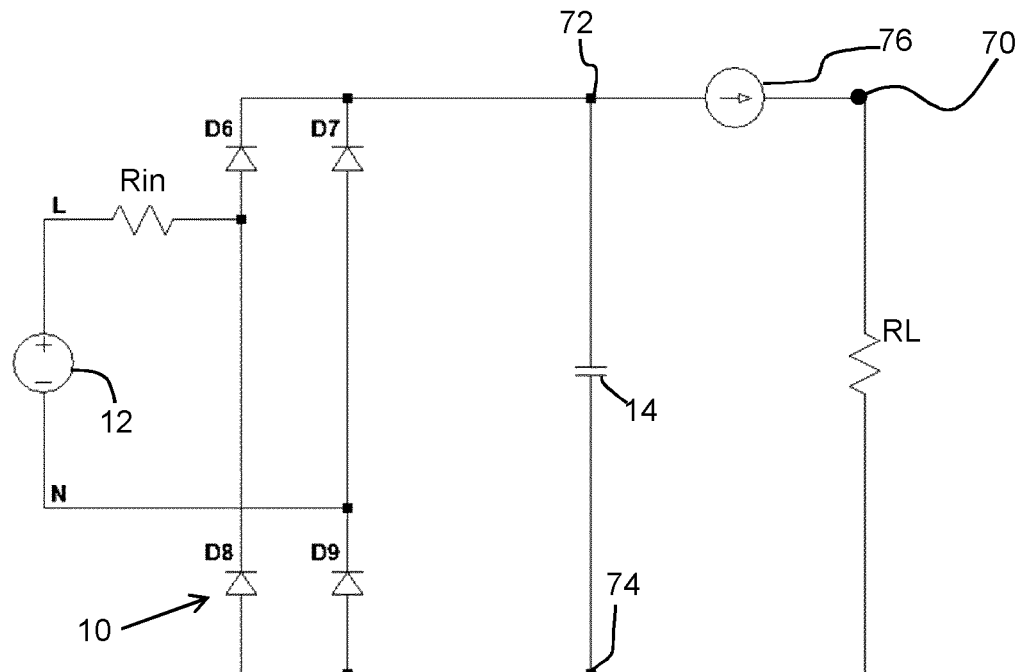
FIG. 7 shows a known AC/DC converter architecture in schematic form.

FIG. 7 shows a known AC/DC converter in schematic form, comprising an AC input for receiving an AC input signal 12 and a DC output 70 for supplying power to a load RL. As in the circuits of FIGS. 1, 3 and 5, there is a rectifier 10 having first and second terminals 72, 74 across which the rectified signal is provided. The AC input delivers current to the rectifier through an input resistor Rin, which may comprise a fusistor (a combination of a current limiting resistor and a fuse). A bulk output capacitor 14 is connected between the first and second rectifier terminals 72, 74.

The output capacitor may be a single capacitor or a network of series and/or parallel capacitors. The full rectified voltage is thus used to drive the load.

The converter further comprises a constant current source circuit 76 which provides its output current to the output load RL. The constant current source is provided between the rectified signal (which is between the first and second rectifier terminals 72, 74) and the DC output 76.

The capacitor 14 is thus large enough to absorb fluctuation in the input, and then enable a constant current source to provide the output current. The limitation of this circuit is that it only provides a low power factor (e.g. only slightly greater than 0.5) or, if designed for a medium power factor, has such a large voltage ripple that the driver efficiency reduces too much, or the output LED current becomes discontinuous, giving rise to undesired light flicker.

Figure 8:
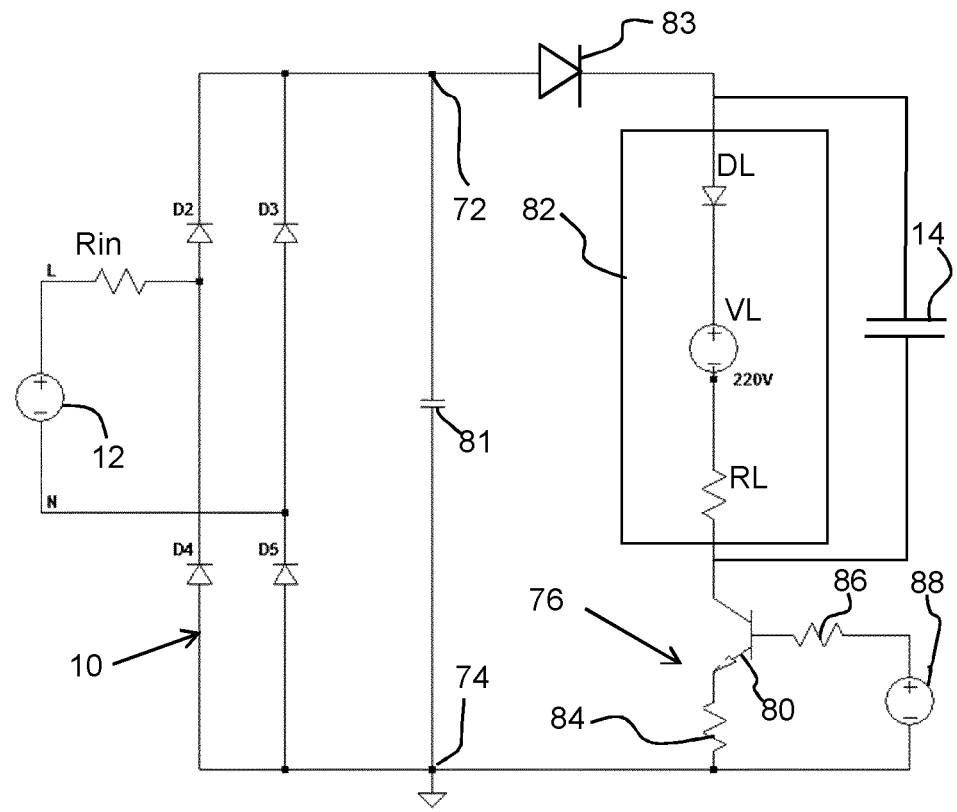
FIG. 8 shows a first implementation of an AC/DC converter.

FIG. 8 shows a first implementation of a circuit in accordance with the invention.

Instead of providing a bulk capacitor 14 between the rectifier terminals, a smaller waveform shaping capacitor 81 is provided. It performs shaping of the input current and limits the gradient of output voltage changes in response to large surges in input voltage.

A bulk capacitor must be large enough to smooth the rectified waveform and deliver a continuous current output. The waveform shaping capacitor 81 is much smaller and this enables a higher power factor to be achieved. By way of example, the waveform shaping capacitor may have a capacitance in the range 100 nF to 1 µF whereas a bulk capacitor may have a capacitance in the range 1 µF to 100 µF. A smaller waveform shaping capacitor gives rise to a more square current waveform profile and a higher power factor, but it does not enable a continuous current to be provided to the load.

This continuous current is instead ensured by providing a bulk capacitor 14 across the load itself.

The circuit again comprises a current source circuit 76. As shown, the bulk capacitor 14 is only across the load and not across the series connection of the load and the current source circuit 76. The current source circuit is switched on and off with timing which is dependent on the phase of the AC input signal. In this way, power factor correction is implemented based on the timing of activation of the current source circuit 76.

This converter makes use of the standard configuration of a rectifier and output capacitor, but the output capacitor is much smaller. When the current source circuit is switched on, the current is provided to the load and its parallel bulk capacitor, and when it is switched off, no current is delivered to the load and its parallel bulk capacitor, but the bulk capacitor maintains a current through the load.

This circuit enables an increase in the power factor compared to a basic rectifier circuit, but without introducing excessive complexity to the circuit. The converter may be integrated into a low cost product, such as an LED bulb.

The current source circuit 76 for example delivers a constant current when switched on. Thus, the output current has a square wave profile. This enables a most simple implementation.

In the example shown in FIG. 8, the current source circuit 76 is implemented as a linear current source comprising a bipolar junction transistor 80 in series with the load 82. The load 82 is shown as an equivalent circuit for an LED string, comprising diode DL, voltage source VL and load resistance RL. A blocking diode 83 is also provided in series with the LED load 82, for limiting the reverse voltage that arises across the transistor 80.

There is a shunt resistor 84 between the emitter and ground and a base resistor 86 coupled to a voltage source 88. The circuit 76 functions as a constant current source with a current, effectively only dependent on the voltage source 88 (minus the base-emitter voltage, typically being 0.7V), and the size of the shunt resistor 84. The base is supplied with a constant voltage from the voltage source 88. This may be of the order of a few volts.

Changes in the mains input voltage result in changes in the collector-emitter (or drain-source) transistor voltage, effectively controlling the timing of switching on and off of the current source circuit. Specifically, if the voltage across the waveform shaping capacitor 81 is larger than the actual voltage across the load 82, the current source is switched on. The current source is successively switched on and off during a switching period, the switching period being a period wherein the voltage across the waveform shaping capacitor 81 is larger than the actual voltage across the load 82.

This allows the duration of the on-time of the current source and the positioning of the on-time duration of the current source in time to be controlled independently. The amplitude of the current is e.g. determined by the DC voltage source, the base-emitter transistor voltage (usually around 0.7V) and the size of the shunt resistor.

Another example may be that if the voltage across the waveform shaping capacitor 81 is larger than the actual voltage across the load 82, the current source is switched on, otherwise it is switched off. The amplitude of the current is e.g. determined by the DC voltage source, the base-emitter transistor voltage (usually around 0.7V) and the size of the shunt resistor. This example has the advantage that it can be more easily controlled.

In this circuit, a smaller sized waveform shaping capacitor 81 is used after the full bridge rectifier compared to the classical circuit of FIG. 1, for the same power requirements. The capacitor is discharged by an essentially constant block current.

The phase angle at which this block current starts is actively or passively chosen such that it is smaller than 65 degrees radians. In combination with the waveform shaping capacitor 81 of the required size this results in an input current waveform that has an input power factor of greater than 0.7 whilst also meeting the special mains input current waveform requirements of IEC61000-3-2.

For the mains input current to have its maximum value per mains half cycle before or at 65 degrees (according to IEC61000-3-2), the size of the waveform shaping capacitor 81 needs to be higher than a certain minimum which basically depends on the desired output power. For economic reasons and to keep the power factor high it should also not be much larger than this minimum. The maximum current is essentially at the moment the block current starts to flow.

The circuit enables very simple current source control, making use simply of a DC value with no dynamic control needed. No Zener diode is also needed across the current source: a Zener diode is often only a one-time protection, under surge conditions it can easily break. The waveform shaping capacitor provides a more robust approach, especially if used in combination with disabling the current source under surge conditions.

Figure 9:
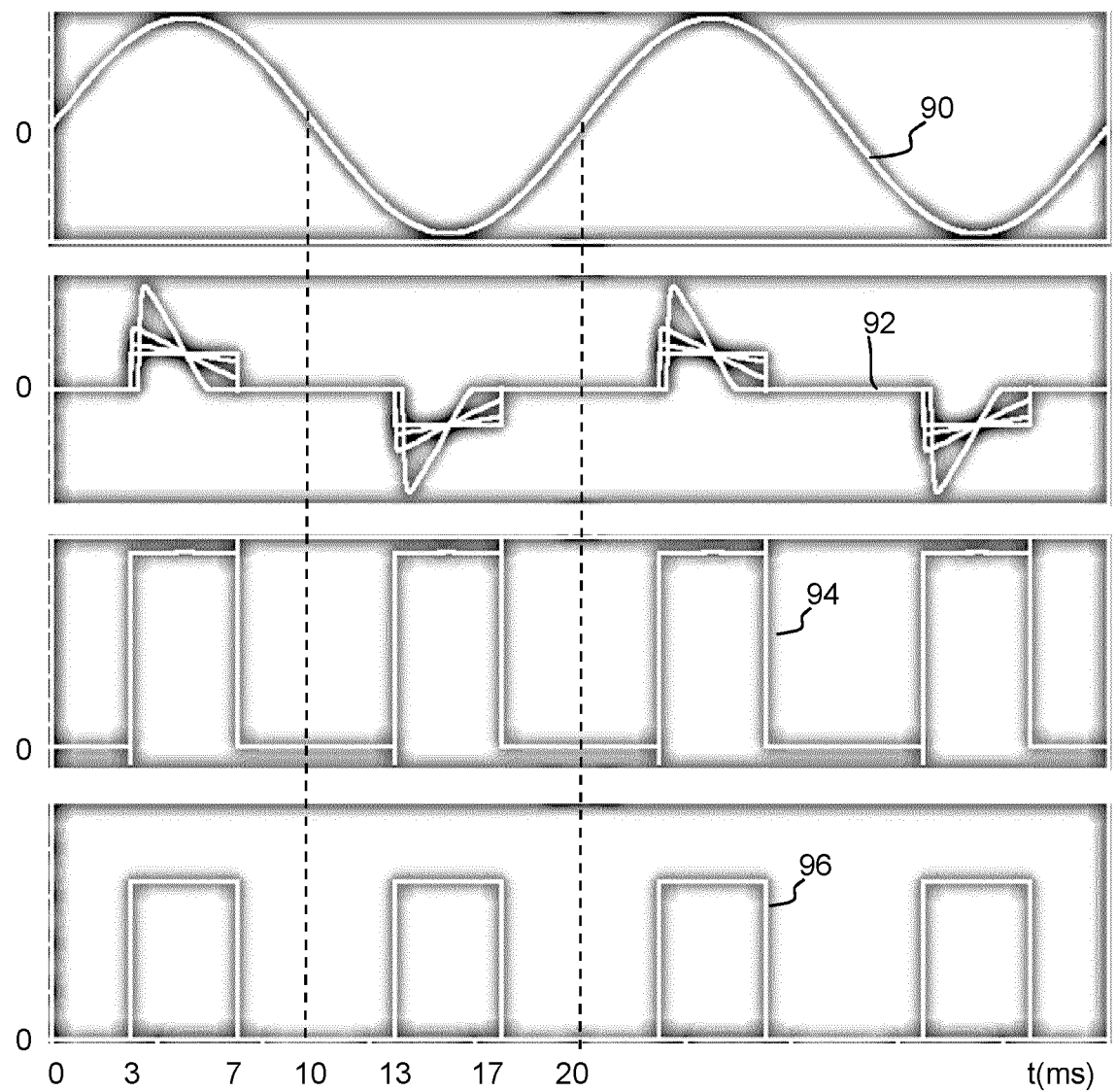
FIG. 9 shows waveforms for the circuit of FIG. 8.

FIG. 9 shows waveforms for the circuit of FIG. 8.

Plot 90 shows the mains voltage. Plot 92 shows the input current flowing from the AC input to the rectifier. Four different input current plots are shown, for four different sizes of the waveform shaping capacitor 81.

Plot 94 shows the current flowing through the decoupling diode 83. It comprises a square wave current profile which is the output current of the current source circuit 76. This current flows to the combined parallel circuit of the LED load and bulk capacitor. The bulk capacitor maintains a current through the load when the current source circuit is off.

Plot 96 shows the timing of operation of the current source circuit 76.

The block current (plot 94) is synchronized with twice the mains frequency (corresponding to the frequency of the rectified signal), and the phase angle at which it starts conducting can be directly or indirectly controlled. The start is before 60 degrees. With the peak of the mains current at or before 65 degrees, this helps to guarantee that the special waveform of IEC61000-3-2 is met.

The block current is preferably actively or passively controlled such that it does not cease before or at $\pi/2$ radians (90 degrees).

For meeting standards, it should at that phase angle have an amplitude of at least 5% of its peak.

In the example shown, the current source circuit is turned on from 3 ms to 7 ms during a mains frequency half cycle of 10 ms in this example. The current through the input resistor Rin, which is the mains input current, nicely shows the desired behavior for fulfilling the special waveform requirements. The influence of the size of the waveform shaping capacitor can also be seen. It should neither be too small thus not peaking at the beginning, nor too large for the given output power (the mains current pulse becomes too small). Thus, the two extreme examples of the plot 92 should be avoided.

The triangular waveform is for a large capacitor 81—for example equivalent to a conventional bulk capacitor. The flatter waveforms are for progressively smaller capacitor 81.

Figure 10:
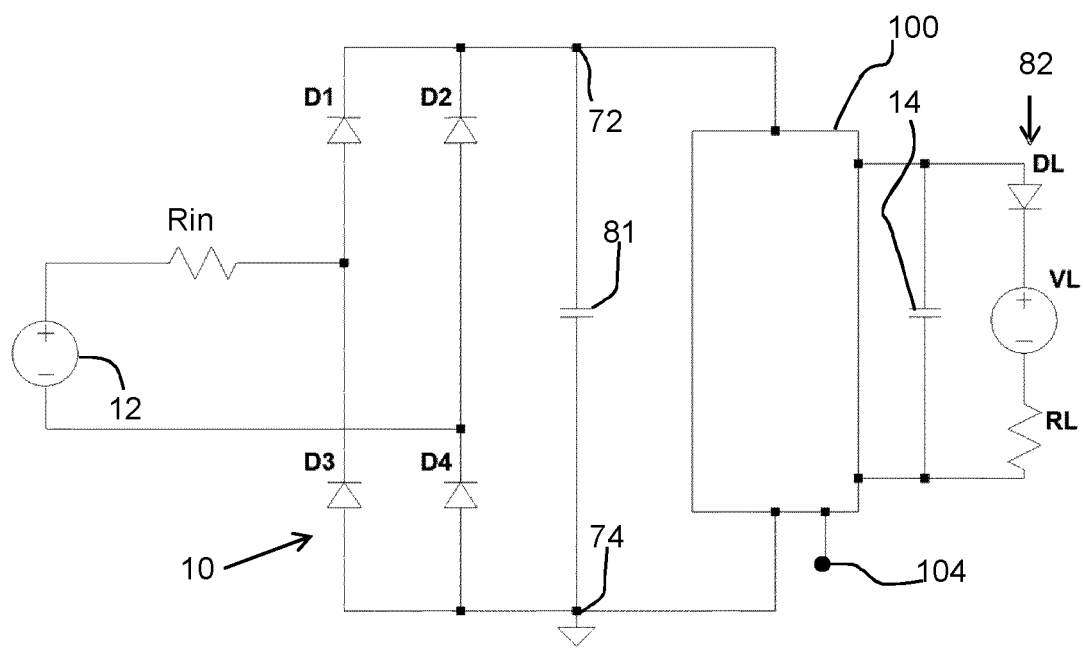
FIG. 10 shows a second implementation of an AC/DC converter.

In another example, shown in FIG. 10, the current source circuit comprises a switch mode power converter, in particular a buck converter 100. This enables a higher efficiency to be achieved over a wider input voltage range. A buck-boost converter may be used.

The converter includes a blocking diode so that the blocking diode 83 of FIG. 8 is not shown.

The buck converter may be a constant current converter that is only enabled when the block current needs to flow. The buck converter has an additional input pin 104 where it can be enabled or disabled depending on the required timing. The timing is for example controlled using a microprocessor or other timing circuitry.

Figure 11:
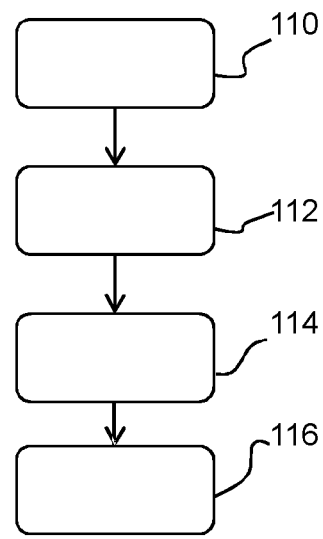
FIG. 11 shows an AC/DC conversion method.

FIG. 11 shows an AC/DC conversion method, comprising:

in step 110 receiving an AC input signal;
in step 112 rectifying the AC input signal;
in step 114 shaping the rectifier signal using a waveform shaping capacitor; and
in step 116 providing an output current to an output load with a bulk capacitor in parallel with the output load, the output current being delivered from the rectifier and waveform shaping capacitor using a current source circuit, wherein step 116 comprises switching on and off the current source circuit with timing which is dependent on the phase of the AC input signal.

The current source switching is entirely passive in the example above and follows automatically from the input voltage waveform and the load voltage. Active switching may instead be carried out.

Figure 12:
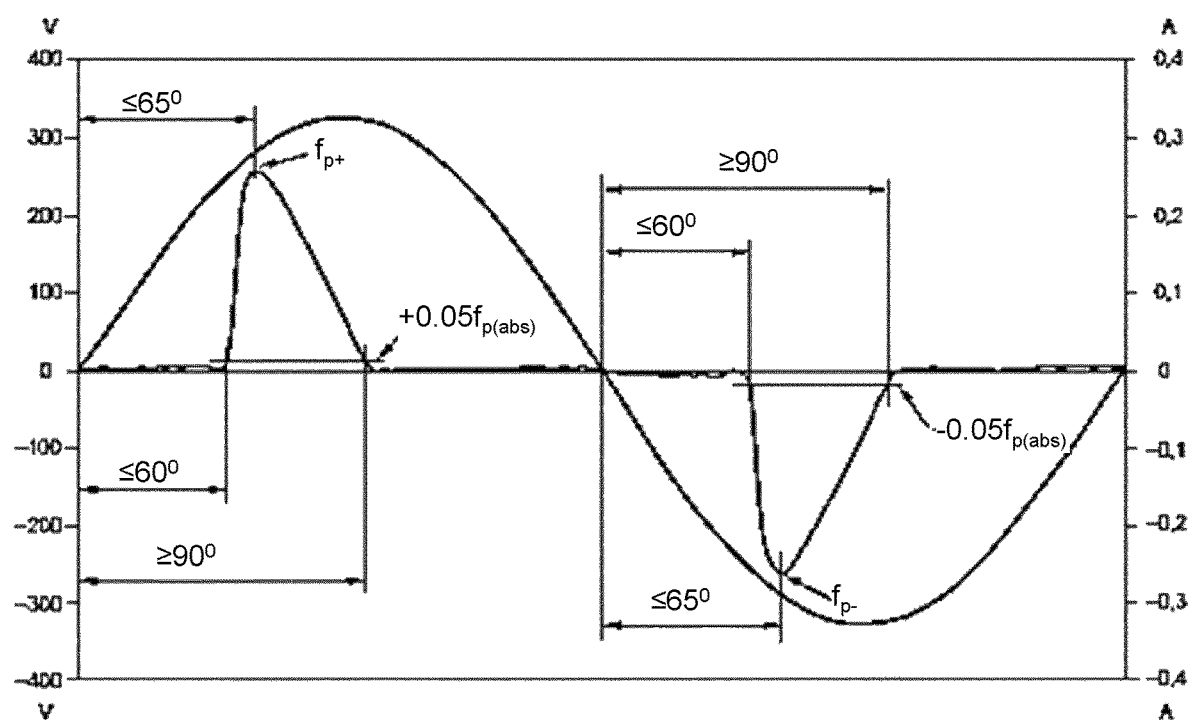
FIG. 12 shows a current waveform shape in order to explain a set of requirements that may need to be met.

As mentioned above, one requirement that may need to be met is the special current waveform shape defined in IEC62000-3-2. For completeness, the requirements are explained with reference to FIG. 12.

The requirements are that the third harmonic current, expressed as a percentage of the fundamental current, shall not exceed 86% and the fifth harmonic current shall not exceed 61%.

Also, the waveform of the input current shall be such that it reaches the 5% current threshold before or at 60 degrees (3.33 ms for 50 Hz), has its peak value before or at 65 degrees (3.611 ms) and does not fall below the 5% current threshold before 90 degrees (5 ms), referenced to any zero crossing of the fundamental supply voltage. The current threshold is 5% of the highest absolute peak value that occurs in the measurement window, and the phase angle measurements are made on the cycle that includes this absolute peak value. Components of current with frequencies above 9 kHz shall not influence this evaluation.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An AC/DC converter, comprising:
an AC input for receiving an AC input signal and a DC output for supplying power to a load;
a rectifier providing a rectified signal between first and second rectifier terminals;
a waveform shaping capacitor connected between the first and second rectifier terminals;
a current source circuit connected in series with the DC output; and
a bulk capacitor connected in parallel with the DC output having a larger capacitance than the waveform shaping capacitor,
wherein the current source circuit is adapted to successively switch on and off during a switching period, the switching period being a period wherein a voltage across the waveform shaping capacitor is larger than an actual voltage across the load, and wherein when the current source circuit is switched on, the current is provided to the load and the parallel bulk capacitor, and when the current source circuit is switched off, no current is delivered to the load and the parallel bulk capacitor, but the bulk capacitor maintains a current through the load such that the requirements for IEC62000-3-2 are met.

2. A converter as claimed in claim 1, wherein the current source circuit is adapted to deliver a constant current when switched on.

3. A converter as claimed in claim 1, wherein the current source circuit comprises a linear current source circuit.

4. A converter as claimed in claim 3, wherein the current source circuit comprises a transistor in series with the DC output and a constant voltage source providing a control voltage to a control terminal of the transistor.

5. A converter as claimed in claim 1, wherein the current source circuit comprises a switch mode power converter.

6. A converter as claimed in claim 5, wherein the current source circuit comprises a buck converter.

7. A converter as claimed in claim 1, further comprising a blocking diode in series with the DC output.

8. A converter as claimed in claim 1, adapted to switch on the current source when a phase angle of the AC input signal is smaller than 65 degrees and to subsequently switch off the current source circuit when a phase angle of the AC input signal is greater than 90 degrees.

9. A converter as claimed in claim 1, having a power factor of between 0.7 and 0.9.

10. A converter as claimed in claim 1, wherein the waveform shaping capacitor has a capacitance in the range 100 nF to 1 µF and the bulk capacitor has a capacitance in the range 1 µF to 100 µF.

11. A lighting circuit comprising:
an LED driver comprising an AC/DC converter as claimed in claim 1; and
an LED load connected to the DC output.

12. The converter as claimed in claim 1, wherein the requirements for IEC62000-3-2 include a third harmonic current, expressed as a percentage of a fundamental current, shall not exceed 86% and a fifth harmonic current shall not exceed 61%.

13. An AC/DC conversion method, comprising:
receiving an AC input signal;
rectifying the AC input signal;
shaping the rectified signal using a waveform shaping capacitor; and
providing an output current to an output load with a bulk capacitor in parallel with the output load having a larger capacitance than the waveform shaping capacitor, the output current being delivered from the rectifier and waveform shaping capacitor using a current source circuit, wherein the method comprises switching on and off the current source circuit with timing which is dependent on the phase of the AC input signal such that the requirements for IEC62000-3-2 are met.

14. A method as claimed in claim 13, comprising providing an essentially constant current when the current source circuit is switched on, and comprising switching on the current source circuit when a phase angle of the AC input signal is smaller than 65 degrees and subsequently switching off the current source circuit when a phase angle of the AC input signal is greater than 90 degrees.

15. A method of driving an LED arrangement, comprising providing output current to the LED arrangement using the method of claim 13.

* * * * *